A. O. HIGINBOTHAM.
DRIVING AND STEERING MECHANISM.
APPLICATION FILED MAR. 15, 1918.
1,368,436.
Patented Feb. 15, 1921.
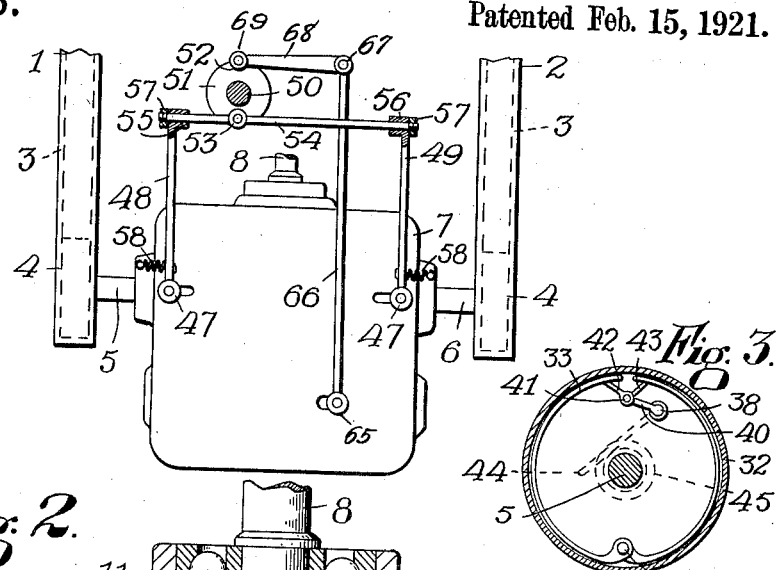
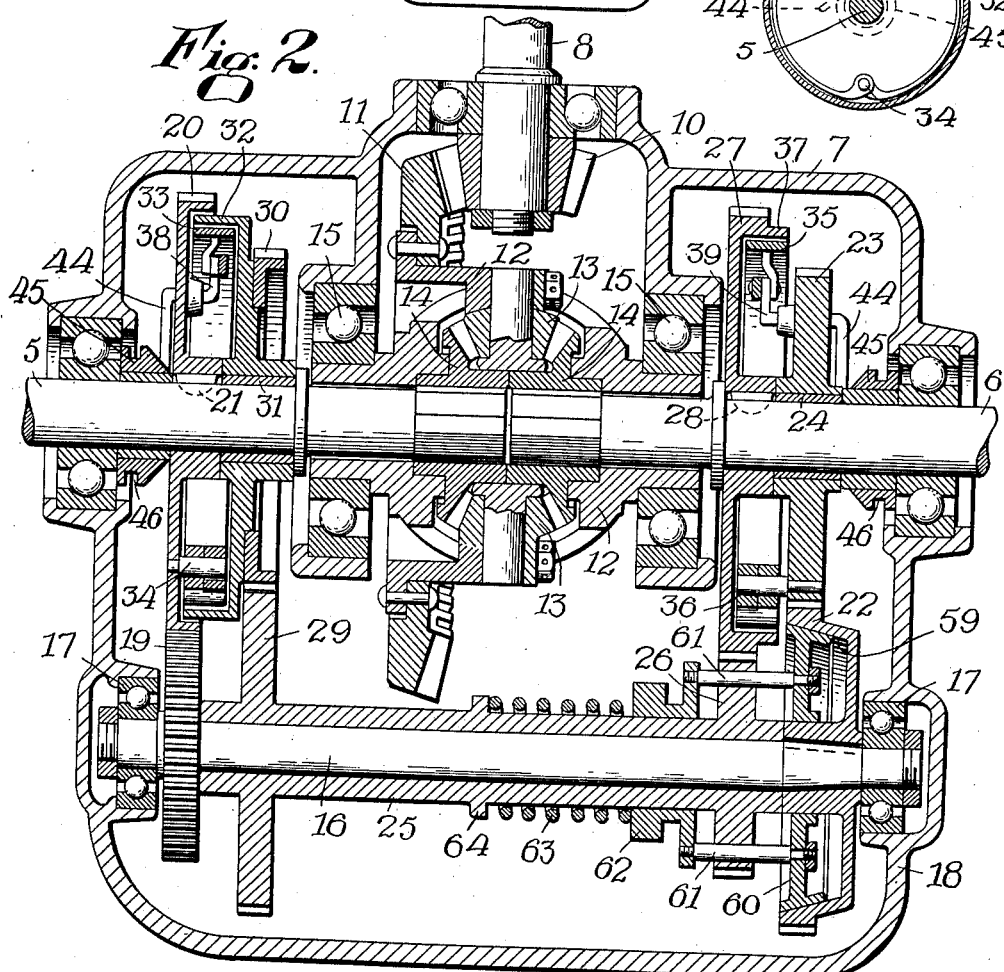
Inventor
Arthur O. Higinbotham
By Attorneys
Fowler & Kennedy

UNITED STATES PATENT OFFICE.

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

DRIVING AND STEERING MECHANISM.

1,368,436.  Specification of Letters Patent.  Patented Feb. 15, 1921.

Application filed March 15, 1918. Serial No. 222,622.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Driving and Steering Mechanism, of which the following, together with the accompanying drawings, is a specification.

The present invention is designed as an improvement upon the driving and steering mechanism for tractors which is set forth and described in my copending application Serial No. 193,567, filed September 27, 1917.

The present invention, in common with that of my aforesaid copending application, contemplates the utilization of the so-called differential gearing for effecting the steering or turning of the tractor or other vehicle. In addition, the present invention provides a combination and arrangement of parts whereby the tractor, or other vehicle, in its straight line travel, is held to a true course and prevented from being deflected by inequalities or obstructions in the surface over which it travels. The mechanism by which the above and other objects are attained, as employed in combination with the mechanism of my aforesaid copending application, will now be described in detail, reference being had in this connection to the accompanying drawings, in which—

Figure 1 is a diagrammatic plan view of so much of a tractor or other vehicle as is necessary to illustrate the working of my invention.

Fig. 2 is a sectional view illustrating the mechanism of my invention as incorporated with an ordinary type of differential gearing.

Fig. 3 is a detail sectional view illustrating the operation of clutching devices which are used in the mechanism of Fig. 2.

Like reference characters refer to like parts in the different figures.

Referring to Fig. 1, the rear end of the tractor therein shown is provided with the usual elongated traction members 1 and 2, each consisting of endless traction belts 3, 3, whose lower courses are adapted for contact with the ground, whereby the propulsion of the machine is secured. Driving sprockets 4, 4 for said belts are carried on the respective shafts 5 and 6 of the "differential" or compensating gearing contained in the usual casing 7, as indicated in detail in Fig. 2, said gearing being connected and driven from the usual motor, clutch and transmission, not shown, by means of a propeller shaft 8.

The interior of casing 7 is shown in Fig. 2, with the propeller shaft 8 secured to the usual driving pinion 10 of the differential gearing, and the shafts 5 and 6 adapted to be driven thereby in the usual manner. To this end the driving pinion 10 is in mesh with the usual crown gear 11, carried on rotatable member 12, in which the bevel gears 13, 13 are journaled so as to mesh with the bevel gears 14, 14, having suitable spline connections with the opposing ends of shafts 5 and 6. It will be understood that the mechanism above described is typical in all respects of the usual type of differential or compensating gearing, which is ordinarily employed to transmit the power of the propeller shaft equally to both shafts 5 and 6, but which is designed, in motor vehicle practice, to permit the rotation of said shafts at different speeds, as when rounding a curve, without loss of power. The rotatable member 12 is here shown as the usual two-part housing, suitably journaled in the anti-friction bearings 15, 15 which are carried by the casing 7.

As described in my aforesaid copending application, a shaft 16 is provided, suitably journaled in bearings 17, 17 of an extension 18 of casing 7. The shaft 16 carries at one end a pinion 19 that meshes with a gear 20, which is keyed or otherwise secured at 21 to the shaft 5. The pinion 19 and gear 20 establish a definite speed ratio between shaft 5 and the shaft 16, as for instance a two to one ratio, whereby the shaft 16 will rotate at twice the speed of the shaft 5. The shaft 16 carries at its other end a gear 22 which meshes with a gear 23 running loosely on shaft 6, the hub of said gear 23 being preferably journaled on a sleeve 24. The gears 22 and 23 have a definite speed ratio, in the present instance a one to one ratio, and thus the gear 23 in the present construction may be assumed to rotate, under normal conditions of equal draft on shafts 5 and 6, at twice the speed of said shafts.

An additional shaft is provided for transmitting rotation from a fixed gear on shaft 6 to a loose gear on shaft 5, thus reversing the conditions created by the mechanism above described, and for convenience of construction, this second countershaft 25 is made hollow, and journaled directly on the shaft 16, between the pinion 19 and gear 22. The shaft 25 has an integral pinion 26 which meshes with a gear 27 that is secured to shaft 6 by any suitable means, such as a key 28. The ratio of gear 27 to pinion 26 is the same as the ratio of gear 20 to pinion 19, in the present instance a two to one ratio. A gear 29 on the other end of shaft 25 meshes with a loose gear 30 on shaft 5, the hub of said gear 30 being preferably journaled on a sleeve or bushing 31. The ratio of gear 29 to gear 30 is the same as the ratio of gear 22 to gear 23, in the present instance a one to one ratio.

Means are provided for clutching the adjacent fast and loose gears 20 and 30 respectively, to cause their rotation in unison, and to this end, as here shown, the loose gear 30 has a rim 32 whose interior periphery is adapted for frictional engagement by an expanding and contracting clutching member 33, as shown in Fig. 3. The clutching member 33 is secured by a pin 34 to the fast gear 20, to rotate in unison therewith, and in the normal operation of the tractor, said clutching member is contracted and out of engagement with the rim 32. The same is true of a similar clutching member 35 which is secured by a pin 36 to loose gear 23, and said clutching member is adapted to coöperate, when actuated, with a rim 37 on fast gear 27.

The normally inoperative clutching members 33 and 35 are adapted to be expanded, when desired, into engagement with their respective coöperating surfaces 32 and 37 by means of bell cranks 38, 39 respectively, each of which is pivotally carried by the same gear to which its associated clutching member is secured, namely the gear 20 in one case and the gear 23 in the other. As here shown, these bell cranks extend at their pivotal centers entirely through their supporting gears, and each has an inner arm 40 which is pivotally connected at 41 to the knuckle of a toggle-joint, consisting of links 42 and 43 pivotally attached to the adjacent free ends of each clutching member 33, 35. The outer arm 44 of each bell crank 38, 39 extends downwardly in a different direction from the inner arm 40, with its free end adapted to be acted upon by the surface of a sliding frusto-conical sleeve 45, one of the latter on shaft 5, for coöperation with bell crank 38 and the other on shaft 6, for coöperation with bell crank 39. As will be apparent, the inward movement of each sleeve 45 will rock its associated bell crank in such a manner as to spread the toggle-joint 42, 43 and thereby expand the associated clutching member 33 or 35 into frictional contact with the surface 32 or the surface 37, as the case may be.

The sleeves 45 for operating the clutching members 33 and 35 are each provided with grooves 46 for engagement by suitable shipping devices 47, 47, Fig. 1. The latter are carried by suitable arms 48 and 49, extending forwardly from the differential casing 7 toward the steering post 50 of the tractor or vehicle. The steering post 50 has secured to its lower end a cam disk 51, which is circular in outline except for a depression 52 in its edge, for a purpose hereinafter described. The disk 51 has connected thereto at 53 a rod 54, the ends of which are slidable through members 55 and 56 on the arms 48 and 49 respectively, and carry thrust nuts 57, 57. When the steering post 50 is moved in a clockwise direction, by means of the steering wheel, not shown, the arm 49 is drawn to the left, Fig. 1, to throw the right hand sleeve 45 inward, and thereby engage the clutch 35, for a purpose hereinafter described, the rod 54 moving through the member 55 without effect on arm 48. The opposite movement of the steering post from the position shown in Fig. 1 effects the engagement of clutch 33, as will be apparent, while the return of the disk 51 to the position shown in Fig. 1, which may be called its neutral position, is accompanied by the disengagement of whichever clutch member 33 or 35 may have been operated, this disengagement being effected by means of springs 58, 58 acting on the levers 48 and 49.

When the clutch 33 is operated to cause frictional engagement between fast gear 20 and loose gear 30, the shaft 5 being thus connected to said rapidly rotating loose gear, is speeded up, and the shaft 6, by reason of the connection of gear 30 to a slower moving part, is slowed down. This action is transmitted by the differential gearing 12, 13 and 14 through which the two shafts 5 and 6 are connected to the propeller shaft 8. In other words, by the operation of clutching member 33, a braking action is imposed on the shaft 6 to slow the same down, and through the differential gearing, to correspondingly increase the speed of shaft 5; but this braking action is radically different from that which would ensue if the shaft 6 were braked from the framework or other stationary part of the tractor. In the present instance there is no loss of power whatsoever, as fully set forth in my aforesaid copending application, since the amount by which the power of shaft 6 is decreased, is added to the power of shaft 5, through the countershaft 25 and the gearing 26, 27, 29 and 30. By this operation the speed of traction member 1 is increased, with the described ratios of gearing, to twice that of traction member 2, whose speed is correspondingly reduced. The tractor is thus caused, in its forward movement, to turn to the right, Fig. 1, with both sides thereof still traveling forward, but with one side at a higher rate of speed than the other. The opposite turning movement of the tractor, it will be obvious, is accomplished by the operation of clutching member 35, to increase the speed of shaft 6 and decrease the speed of shaft 5, through the countershaft 16 and gearing 19, 20, 22 and 23. The foregoing mode of operation, for steering the tractor or vehicle through the action of the differential gearing, is fully described in my aforesaid copending application, and the present invention is designed as an improvement thereon with reference to the provision of means for holding the tractor to a straight line course when no turning is desired, i. e., when the steering post is in the neutral position shown in Fig. 1. This is accomplished by eliminating, under this particular condition of operation, the differential action of the gearing 12, 13 and 14, so as to prevent, in this position of the steering post, any difference in speed between the shafts 5 and 6. To this end, means are provided for clutching the two countershafts 16 and 25 together, in the present instance by forming a clutching surface 59 in the face of gear 22 on shaft 16. For coöperation with said clutching surface, a slidable clutching member 60 is carried by a plurality of rods 61 which pass through openings in the gear 26 on shaft 25. Said rods 61 are attached to a sliding collar 62 which is compressed in the direction of gear 22 by means of a spring 63 acting against a shoulder 64 on shaft 25. The collar 62 is engaged by a suitable shipping device 65 secured to an arm 66 of a bell crank, pivoted at 67, with its other arm 68 carrying a roller 69 in engagement with the periphery of cam disk 51. When the steering post 50 is in position for the straight ahead movement of the tractor, as shown in Fig. 1, the two clutches 33 and 35 are disengaged, and the roller 69 drops into the depression 52 of disk 51, allowing the spring 63 to force the clutching member 60 into engagement with clutching surface 59, thereby locking the two shafts 16 and 25 together. This insures the rotation of the driving shafts 5 and 6 at the same speed, and in effect prevents, in this position of the steering post, the action of the differential gearing 12, 13 and 14. In this way all possibility of the tractor being thrown out of its course, or deflected from its straight line movement by any inequality or obstruction in the surface of the ground over which it travels, is entirely eliminated. When it is desired to steer the tractor so as to turn in one direction or the other, the steering post is turned, as above described, to set either the clutch 33 or the clutch 35. The consequent turning of the disk 51 throws the roll 69 out of depression 52 and thereby rocks the bell crank 66, 68 so as to compress spring 63, and thereby disengage the clutching member 60 from surface 59. This disconnection of the countershafts 16 and 25 allows the differential gearing to operate in the manner above described so as to reduce the speed of one traction member and increase the speed of the other, and thus cause the tractor to turn.

I claim:

1. In a motor vehicle, the combination with a "differential" or compensating gearing for the transmission of power to a pair of traction members, of means comprising gearing operable from said traction members to steer the vehicle, and means for rendering the "differential" action of said compensating gearing ineffective when said steering means is in its inoperative position.

2. In a motor vehicle, the combination with a "differential" or compensating gearing for the transmission of power to a pair of traction members, of means comprising gearing operable from said traction members to steer the vehicle by increasing the speed of either traction member over that of the other, and means for preventing the "differential" action of said compensating gearing when the steering means is not functioning to change the direction of movement of the vehicle.

3. In a motor vehicle, the combination with a "differential" or compensating gearing for the transmission of power to a pair of traction members, of a locking means therefor in the straight-ahead movement of the vehicle, and means for steering said vehicle through gearing driven from said traction members, the operation of said steering means rendering said locking means inoperative.

4. In a motor vehicle, the combination with a "differential" or compensating gearing for the transmission of power to a pair of traction members, of a normally operative locking means therefor, to constrain the travel of the vehicle in a straight path, a train of gears operable from each traction member to produce rotation at a higher speed than said member, clutching means operable at will to connect either traction member with the train of gears from the other traction member, and means operated by the actuation of said clutching means for rendering said locking means inoperative.

5. In a motor vehicle, the combination with a "differential" or compensating gearing for the delivery of power to a pair of drive shafts, of a locking means for said gearing, normally operative to retain the vehicle in a straight path, a member normally running loose on each shaft, means operatively connecting each loose member with the other shaft, for rotation at a higher speed than said shaft, and selectively operated means to connect either loose member to the shaft on which it runs, and to simultaneously render said locking means inoperative.

6. In a motor vehicle having a pair of independent traction members, means for locking said traction members for rotation in unison, in the straight-ahead movement of the vehicle, and gearing operable from said traction members for establishing at will a change speed ratio between said members, to steer the vehicle in either direction, and for simultaneously rendering said locking means inoperative.

Dated this 11th day of March, 1918.

ARTHUR O. HIGINBOTHAM.

Witnesses:
NELLIE WHALEN,
PENELOPE COMBERBACH.